United States Patent
Schober

[15] 3,673,393
[45] June 27, 1972

[54] TURRET INDEXING CONTROL CIRCUIT

[72] Inventor: Thomas G. Schober, West Seneca, N.Y.
[73] Assignee: Houdaille Industries, Inc., Buffalo, N.Y.
[22] Filed: Sept. 30, 1969
[21] Appl. No.: 862,383

[52] U.S. Cl. ...................235/151.1, 235/151.11, 318/601, 318/603
[51] Int. Cl. .........................................G06f 15/46
[58] Field of Search ..................235/151, 151.1, 151.11; 340/146.1, 146.2, 347; 318/600–601, 609, 612, 603; 33/19; 74/813–816; 198/40

[56] References Cited

UNITED STATES PATENTS

| | | | |
|---|---|---|---|
| 3,123,818 | 3/1964 | Steele | 340/347 |
| 3,248,692 | 4/1966 | Wei Ming Shih | 340/146.1 |
| 3,351,746 | 11/1967 | Gotz et al. | 235/151.11 |
| 3,372,321 | 3/1968 | Seiuemon Inaba et al. | 235/151.11 X |
| 3,400,314 | 9/1968 | Wilson | 235/151.11 UX |
| 3,417,235 | 12/1968 | Clark et al. | 235/151.11 |
| 3,569,815 | 3/1971 | McNaughton | 318/601 |
| 3,541,418 | 11/1970 | Agin et al. | 318/612 |
| 3,262,105 | 7/1966 | Bell | 318/603 X |

Primary Examiner—Malcolm A. Morrison
Assistant Examiner—Jerry Smith
Attorney—Hill, Sherman, Meroni, Gross & Simpson

[57] ABSTRACT

A turret indexing system for machine tools having a position counter for representing turret position, with a predetermined coded signal being operable to automatically index the turret to an initial position and to insert a corresponding initial count in the position counter at start up.

4 Claims, 10 Drawing Figures

INVENTOR.

Thomas G. Schober

BY _____ ATTORNEYS

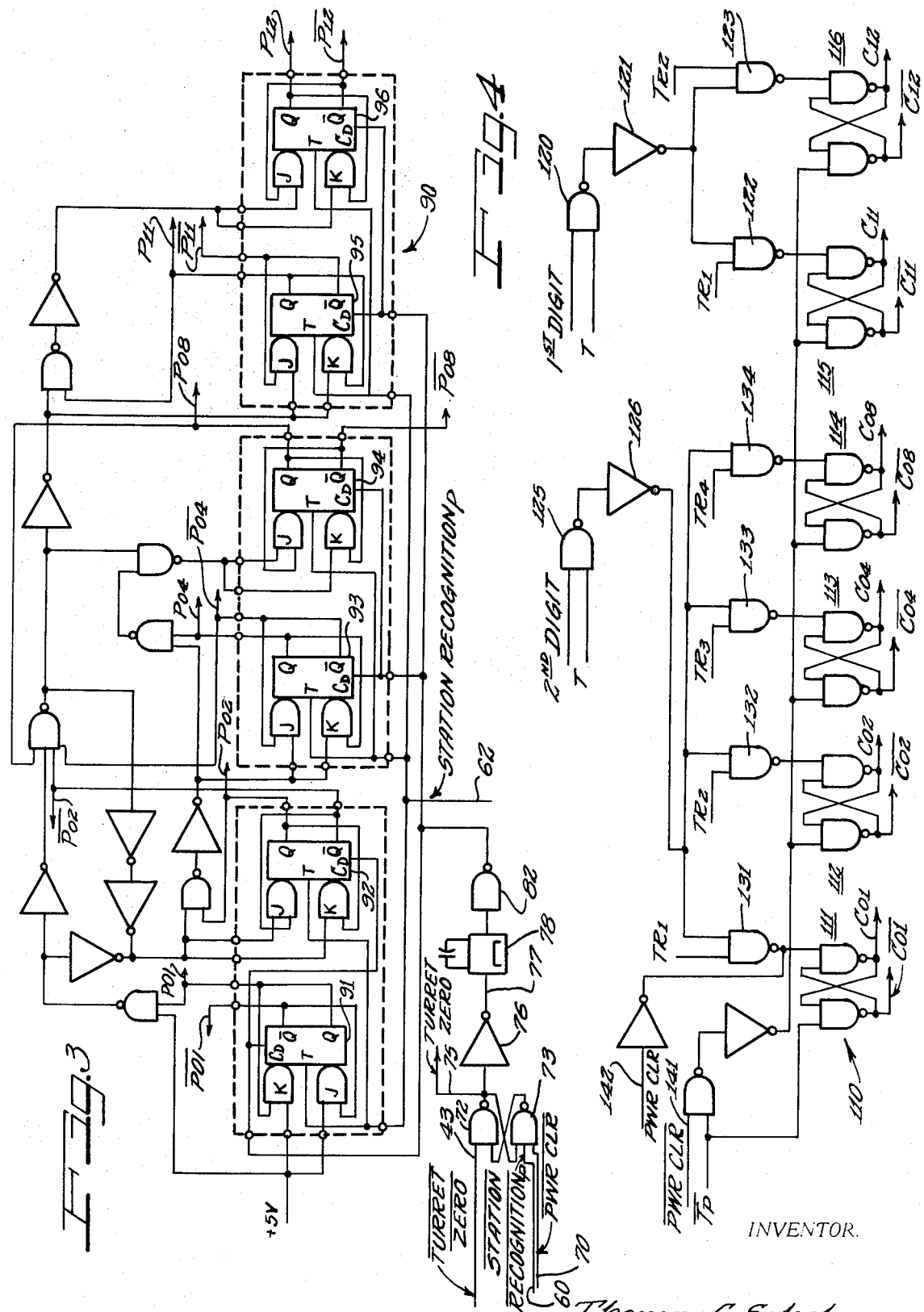

INVENTOR.
Thomas G. Schober
ATTORNEYS

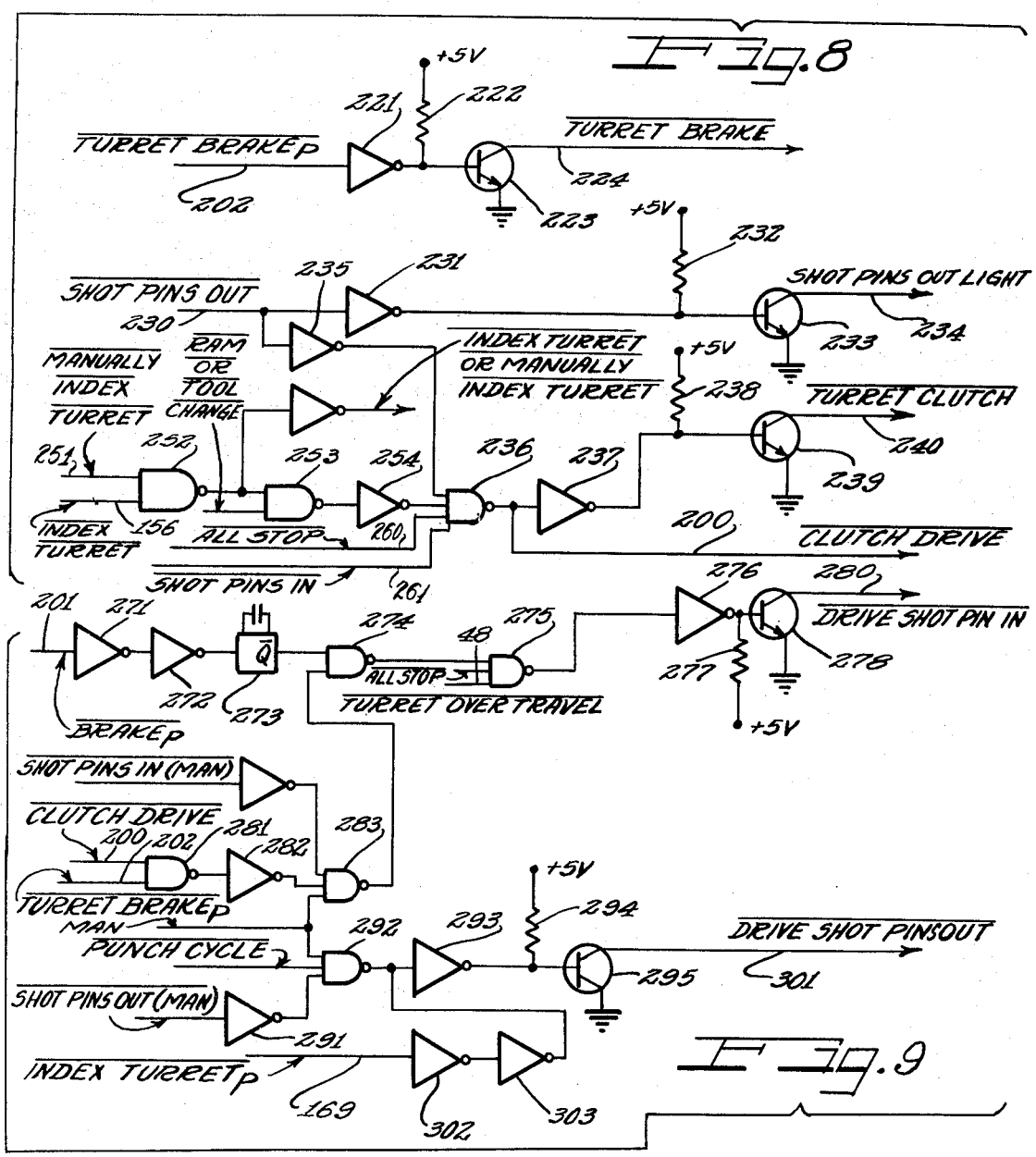
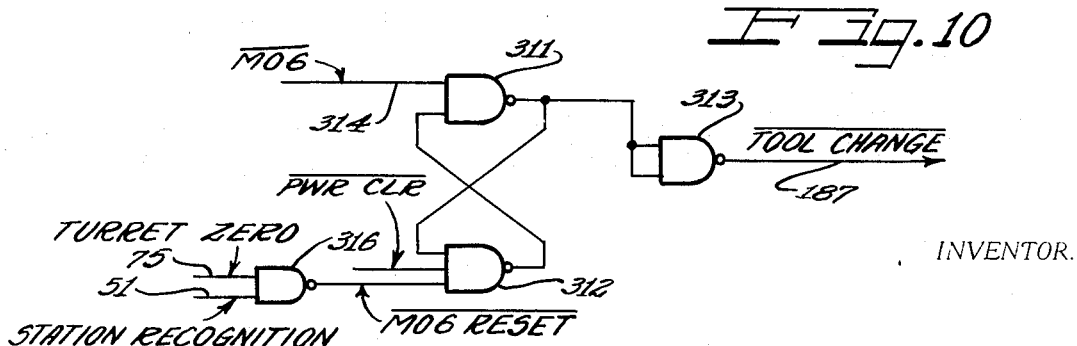

TURRET INDEXING CONTROL CIRCUIT

SUMMARY OF THE INVENTION

This invention relates to a turret indexing control system and particularly to such a system which utilizes an incremental counter for registering turret position during operation.

It is an object of the present invention to provide a novel turret indexing system capable of utilizing an incremental counter to register turret position during operation.

A further object of the invention is to provide such an indexing system wherein the turret is responsive to a digital command to index to a predetermined initial position at start up thereby to insure correspondence between the actual turret position and the count in the incremental counter during operation.

Another object of the invention is to provide such a system wherein an overtravel error automatically produces a signal which may be utilized to interrupt the operation of the machine.

Other objects, features and advantages of the invention will be readily apparent from the following description of a preferred embodiment thereof, taken in conjunction with the accompanying drawings although variations and modifications may be effected without departing from the spirit and scope of the novel concepts of the disclosure.

BRIEF DESCRIPTION OF THE DRAWINGS

FIG. 3 is an electric circuit diagram showing an incremental counting circuit for maintaining a count in accordance with the position of the turret of FIG. 1 during indexing operations;

FIG. 4 is an electric circuit diagram showing a command register for receiving digital turret commands;

FIGS. 6, 7, 8, 9 and 10 show further circuitry of the illustrated turret indexing system.

DETAILED DESCRIPTION OF THE ILLUSTRATED EMBODIMENT

Figure 1:
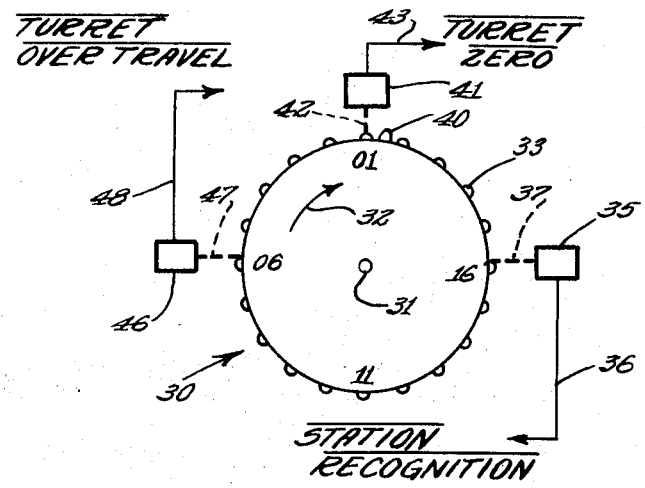
FIG. 1 is a diagrammatic indication of a rotary turret and indicating diagrammatically means for generating certain electrical signals utilized in controlling turret indexing movement.

Referring to FIG. 1, a turret is diagrammatically indicated at 30 for rotation on an axis as indicated at 31 in the direction indicated by arrow 32. The turret 30 is indicated as being provided with a series of 20 cam actuators such as 33 uniformly about the periphery of the turret. The cam actuators serve to define a series of 20 turret positions, positions 01, 06, 11 and 16 being indicated in FIG. 1 by way of example. As the turret approaches each successive position such as position 01 which is illustrated in FIG. 1, a station recognition switch 35 is actuated to transmit a ground signal via output line 36 to the circuit of FIG. 2. The mechanical coupling between the switch 35 and the series of cam actuators 33 is indicated by the dash line 37 in FIG. 1.

A further cam actuator is indicated at 40 which travels in a path clear of the mechanical coupling 37 but is arranged to actuate a turret zero switch 41 as the turret moves to the 01 position shown in FIG. 1. The mechanical coupling between the cam actuator 40 and the switch 41 is indicated by the reference numeral 42. The switch 41 is thus actuated only once for each complete revolution of the turret 30, while the station recognition switch 35 is actuated 20 times for each revolution of the turret 30. Thus, the switch 41 provides a ground signal to output line 43 to signal that the turret is approaching an initial "Turret Zero" position which is actually designated by the decimal number 01 in the illustrated embodiment.

Figure 7:
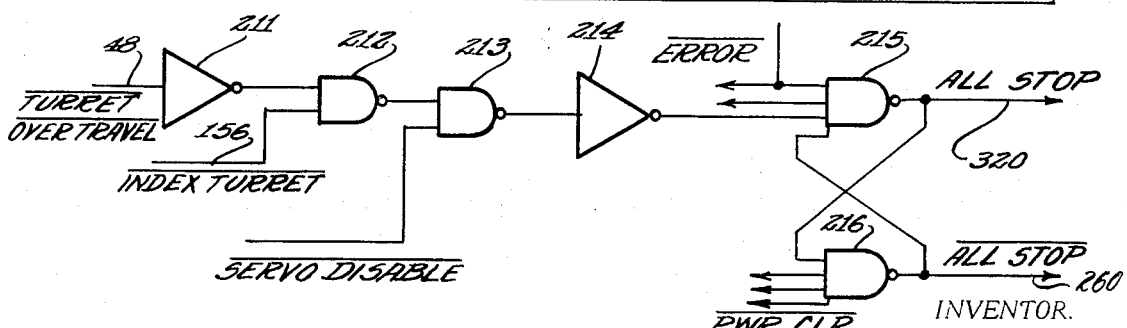

A further switch 46 is provided with a mechanical coupling as indicated at 47 with the successive cam actuators 33 such that the switch 46 will provide a ground signal at output line 48 to signal a turret overtravel condition. By way of example, the mechanical coupling 47 may be arranged to be actuated in the event of an overtravel of three degrees beyond a selected station. The illustrated switch 46 actually operates to transmit a ground signal to line 48 in response to actuation by each of the successive cam actuators 33 during the time that the turret is being indexed to a new position. Additional circuitry as will hereinafter be described with reference to FIG. 7 is provided to determine if a given signal at output line 48 actually represents a turret overtravel condition.

Figure 2:
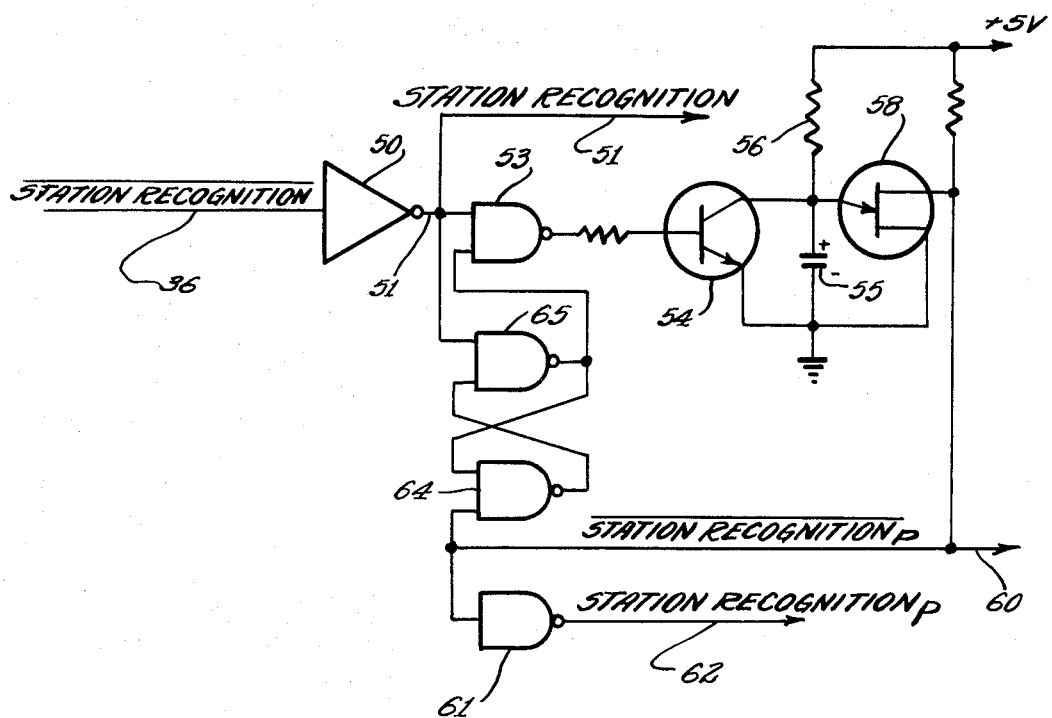
FIG. 2 is an electric circuit diagram showing circuitry for processing the station recognition signal from the switch circuitry of FIG. 1.

Referring to FIG. 2, each station recognition signal is supplied from switch 35, FIG. 1, via output line 36 to inverter 50, FIG. 2, giving rise to a positive going "Station Recognition" signal at line 51. The NAND gate 53 provides a low going output which interrupts conduction of transistor 54 and initiates a charging cycle of capacitor 55 through resistor 56. After a predetermined timing interval, the charge on capacitor 55 is sufficient to render transistor 58 conducting to discharge capacitor 55 and to provide a negative going signal at output line 60. The negative going signal is inverted by component 61 to provide a positive going signal at output line 62 designated "Station Recognition p". As soon as capacitor 55 has sufficiently discharged, transistor 58 becomes non-conducting again. NAND gates 64 and 65 are triggered by the negative going output of transistor 58 to block gate 53 for the duration of the output pulse. When a high signal reappears at input 36, conductor 51 assumes a ground potential and the flip flop 64, 65 is restored to its initial condition. This circuit serves to insure reliable operation of the system.

Referring to the circuit of FIG. 3, a power clear condition at input line 70 to gates 72 and 73 causes output 75 to go low. Inverter 76 provides a high output at 77, which, however, does not trigger the monostable circuit 78. The power clear signal thus places flip flop 72, 73 in condition to respond to a turret zero signal at input 43.

When a turret zero signal is received at 43, conductor 77 is driven a low condition, driving the output of inverter 82 to a low condition for a predetermined time interval sufficient to set incremental counter circuit 90 to a zero count. The counter 90 includes stages 91–94 representing the second digit of the turret index position, while stages 95 and 96 represent the first or tens digit of the turret position. In the illustrated embodiment, stages 91–94 have respective weights of 1, 2, 4 and 8, while stages 95 and 96 have weights of 100 and 20, respectively. The Q outputs of the respective stages are designated PO1, PO2, PO4, and PO8. The Q outputs of stages 95 and 96 are designated P11 and P12. The complementary outputs $\overline{Q}$ are designated $\overline{PO1}$, $\overline{PO2}$, $\overline{PO4}$, and $\overline{PO8}$. The complementary outputs of stages 95 and 96 are designated $\overline{P11}$ and $\overline{P12}$.

The counter 90 has its input connected to output line 62 of FIG. 2 so as to respond to the successive station recognition pulses. Thus in normal indexing operation as the turret moves through successive indexing positions, the counter maintains a count corresponding to the successive positions. When the first four stages 91–94 reach a count of 9, the next station recognition pulse at input 62 resets the stages to zero and sets the stage 95 to a logical one representing condition. After the turret has moved out of turret position 20, the turret zero signal at input line 43 causes the monostable circuit 78 to be triggered, providing a low going signal at the output of inverter 82 which resets the counter to zero. The station recognition pulse associated with turret position number 1 then arrives at input line 62 to cause the counter to register a count of one as the turret moves to position number 1. In this way, the turret zero signal controls the condition of counter 90 during each revolution of the counter to insure proper correspondence between the count in the counter 90 and the actual position of the turret each time the turret moves through the 01 position.

FIG. 4 shows a command register 110 comprising flip flop stages 111–116. The first digit of a desired turret position is loaded into stages 115 and 116, while the second digit is loaded into the stages 111–114. Components 120 and 121 serve to enable gates 122 and 123 during loading of the first digit, and components 125 and 126 serve to enable gates 131–134 during loading of the second digit into the register. The desired turret position may be represented on punched tape by the character T (which produces signals at T and $\overline{T}_p$ in FIG. 4) followed by the first and second digits in coded decimal notation (the tape reader lines TR1–TR4 representing respective bits in a 1–2–4–8 notation). The manner in which the successive digits are loaded into the register 110 from punched tape will be understood by those skilled in the art from the illustration of FIG. 4. The respective outputs from the stages 111–116 are represented by the characters C01, C02, C04, C08, C11, C12 and by the complements of these respective outputs. It will be observed that a power clear signal at input lines 141 and 142 will cause the first stage 111 to be set to a one-representing condition with the output line C01 high, while the remaining stages 112–116 would be set to their zero-representing condition with the outputs C02, C04, C08, C11, and C12 low and the complementary output lines $\overline{C02}$, $\overline{C04}$, $\overline{C08}$, $\overline{C11}$, and $\overline{C12}$ in the high condition.

Figure 5:
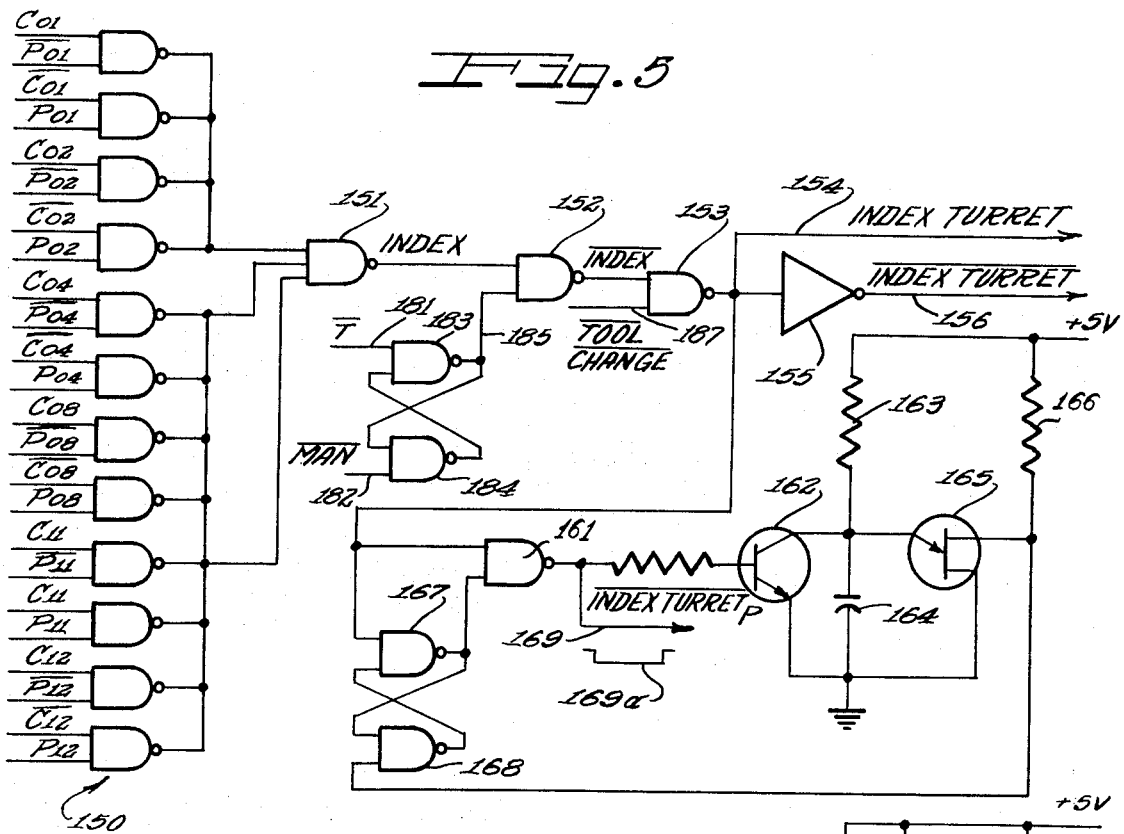
FIG. 5 is an electric circuit diagram showing a comparator circuit for controlling turret indexing in the illustrated system.

Referring to FIG. 5, a NAND comparison circuit is indicated at 150 for determining whether there is an identity between the number registered in the position counter 90 and the position of the command register 110. When the actual position does not correspond to the commanded position, the output of NAND gate 151 is high, and the output of NAND gate 152 is low giving a high at the output of gate 153. Thus, whenever the actual position does not correspond to the commanded position, the index turret signal at conductor 154 is high, and the output of inverter 155 is low signaling for a turret indexing operation. Components 161–168 in FIG. 5 are similar to components 53–58, 64 and 65 in FIG. 2 and operate to provide an index turret pulse signal at 169.

Referring to the circuitry of FIG. 5, it may be noted that the index turret signal at output line 156 from inverter 155 is supplied to an input of the circuits of FIGS. 7 and 8. The index turret pulse at output line 169 in FIG. 5 is supplied as an input to the circuitry of FIG. 9 to initiate a turret indexing operation. Input lines 181 and 182 in FIG. 5 control the condition of a flip flop having components 183 and 184. Thus, when the character T is read from punched tape or other command input, conductor 181 will assume a ground potential, setting the output line 185 to a high condition to enable operation of the circuit. When on the other hand, the system is in the manual mode, conductor 182 will be at ground potential, providing a ground potential at line 185 and disabling the normal indexing operation of the system.

As will hereinafter be explained input line 187 to gate 153 represents the tool change condition, and a ground potential at this input will initiate an indexing operation irrespective of the condition of the comparator circuit 150.

Figure 6:
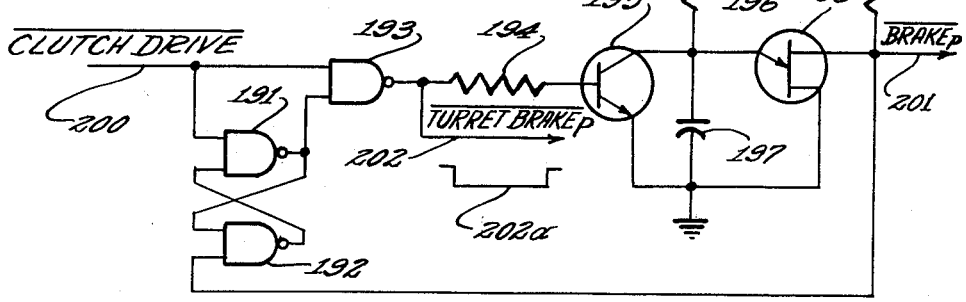

In FIG. 6, components 191–199 act as a one shot with high noise immunity. A high input at line 200, results in an output pulse at the output line 201 after a predetermined time delay and provides a negative pulse of substantial duration at output line 202, the waveform being indicated at 202a. Thus, when the turret clutch is disengaged, the potential at input conductor 200 in FIG. 6 will go high, providing a low output at conductor 202 and initiating the charging cycle for capacitor 197. At the end of the timing cycle, unijunction transistor 198 will be rendered conducting to provide a negative going pulse at the output line 201. The outputs at 201 and 202 are supplied to inputs of FIG. 9 and FIG. 8, respectively for purpose of terminating a turret indexing movement.

FIG. 7 shows a circuit including components 211–216 for generating an all stop condition in response to a turret overtravel signal at input 48 after the turret indexing signal at line 156 has returned to the high condition signifying that the indexing movement should have been interrupted prior to the actuation of the turret overtravel switch 46, FIG. 1. Other inputs are indicated in FIG. 7 which will cause an all stop condition, but the details of these additional inputs need not be described herein.

Referring to FIG. 8, components 221–223 are provided for generating a turret brake signal at output line 224 potential response to the turret brake pulse at input line 202 (whose origin is found in FIG. 6).

Input conductor 230 in FIG. 8 is connected with a "Shot Pins Out" switch supplies a ground potential when the shot pins are disengaged from the turret to allow indexing movement of the turret. Components 231–233 provide for a ground potential at output line 234 which will cause an indicator light to be energized signifying that the shot pins are out. Components 235–239 which are also connected to input 230 provide for a ground potential at output conductor 240 when the shot pins are out, the ground potential at output conductor 240 resulting in the engagement of the turret clutch to initiate driving of the turret to a new indexing position. Of course, such indexing movement is only possible if input conductor 156 is at ground potential to signify that indexing movement is appropriate. Similarly input conductor 251 must in a high condition, the detailed control of this input conductor beinG irrelevant to the purpose of the present disclosure. Thus, if either conductor 156 or conductor 251 is in a high condition, gate 236 is disabled, and the turret indexing operation is inhibited. Similarly if either of inputs 260 or 261 is at ground potential, gate 236 is disabled and the turret clutch cannot be engaged by means of components 237–239.

Components 271–278 in FIG. 9 have the purpose of providing a ground output signal at conductor 280 in response to the brake pulse at conductor 201. Thus, after the turret brakes have been applied by means of conductor 224 at the top of FIG. 8, the negative going pulse at input conductor 201 at the top of FIG. 9 results in a negative going pulse of predetermined duration at the output of the monostable circuit 273, driving the transistor 278 to a conducting condition. Thus, the shot pins are driven in to prevent inadvertent movement of the turret between indexing operations.

It will be observed that conductors 200 and 202 are connected with components 281–283 so that if the potential of both conductors 200 and 202 is high, the shot pins may be driven in during manual operation. Similarly components 291–295 enable driving of the shot pins out in manual mode. In automatic mode, an index turret pulse at conductor 169, FIG. 9, produces a ground potential at output conductor 301 by means of components 302, 303 and 293–295.

Referring to FIG. 10, components 311–313 are provided for the purpose of transmitting a tool change command to the output line 187 which forms an input to the comparator circuit of FIG. 5. Thus, when the tape reader circuit senses the character MO6 from the punched tape or other digital input, a ground potential appears at input line 314, setting flip flop 311, 312 and providing a ground potential output at line 187. The tool change signal at output line 187 causes the turret to be indexed to turret position 01. As seen in FIG. 1, as the turret approaches position 01, cam actuator 40 actuates the turret zero switch 41 to give a ground potential at line 43, FIG. 3 and a high potential signal at line 75, FIGS. 3 and 10. Since the flip flop 72, 73, FIG. 3 remains in the set condition until a station recognition pulse is received at reset input 60, the station recognition signal will be present at line 51 in FIG. 10 simultaneously with the turret zero signal at line 75, FIG. 10, so that gate 316 will reset the flip flop 311, 312 and interrupt the indexing operation as the turret reaches the 01 position.

In the illustrated embodiment, the character MO6 is supplied to the system at start up so as to insure that the position count of counter 90, FIG. 3 conforms with the actual turret position. At start up, a switch is placed in one of the manual modes giving rise to a power clear signal for example at input line 70, FIG. 3, and input lines 141 and 142, FIG. 4. At the same time a ground potential is supplied to input line 182, FIG. 5, so as to insure that the output of gate 152 will be low at this time. When the tape reader is started, before any positioning commands, the character MO6 will be read generating the tool change signal at conductor 187, FIG. 10 which causes turret indexing operation to be initiated by the circuit of FIG. 5.

SUMMARY OF OPERATION

Each time the system is started up, a power clear signal is generated which insures that the various flip flops are reset and which places the command register 111–116 in the condition representing turret position 01 (which happens to be the position of the turret as shown in FIG. 1). The manual signal is present at this time supplying a ground potential at conductor 182, FIG. 5 to insure that flip flop 183, 184 does not initiate turret indexing at this time. When indexing operation of the turret is to be controlled from punch tape, for example, the punch tape will have the code MO6 thereon before any positioning commands, and this digital signal at input line 314, FIG. 10 will give rise to a tool change signal at line 187 which connects with the input of gate 153, FIG. 5 and generates the index turret signal at conductors 154 and 156. An index turret pulse is generated at line 169, FIG. 5, as represented by waveform 169a, and this signal at the input to inverter 302, FIG. 9, causes a ground potential at output line 301, FIG. 9 to retract the shot pins which normally prevent rotation of the turret. When the shot pins are out, a switch is actuated to supply ground potential to input line 230, FIG. 8, resulting in a ground potential at output line 240 for engaging the turret clutch. The turret now begins its indexing operation which continues until the flip flop 311, 312, FIG. 10 is reset when the turret zero switch 41, FIG. 1 is actuated, followed by the actuation of the station recognition switch 35 as the turret approaches the 01 position shown in FIG. 1.

With the ground potential removed from line 187, FIG. 10, the output of inverter 153, FIG. 5, goes low, signifying the termination of pulse 169a at output 169. At this time, the index turret signal at 156, FIG. 5 goes high, causing the output of gate 252, FIG. 8, to go low and thus causing the output line 200 to have a high potential. A high potential at conductor 200, FIG. 6, causes the output of inverter 193 to go low initiating the turret brake pulse indicated by the waveform 202a at output line 202. This signal causes output line 224 shown at the top of FIG. 8 to go to ground energizing the turret brake to stop the turret at the 01 position. The subsequent brake pulse at output line 201, FIG. 6 is supplied to inverter 271, FIG. 9 and results in a ground potential at line 280 for driving the shot pins in and preventing further movement of the turret.

Thereafter successive commands are supplied to the command register 111–116 in FIG. 4. The position register 90 represents the actual position of the turret, and any discrepancy between the actual and commanded positions is sensed by the comparator circuit 150, FIG. 5. Thus, when a new command is entered into the register 110, FIG. 4, there will be a high index signal at the output of gate 151, FIG. 5, producing indexing of the turret. As the turret approaches each successive indexing position, one of the cam actuators 33 will momentarily actuate the station recognition switch 35, causing the position counter 90 to register the new index position. When the position represented by the counter 90 corresponds to the commanded position of register 110, the output of gate 151, FIG. 5, will go to a ground potential to cause the application of the turret brake and fix the turret in the new position.

If the turret should overtravel a commanded position, the turret overtravel switch 46 will be actuated to supply a ground potential to conductor 48, FIG. 7 at the input to inverter 211. If at the time of occurrence of the turret overtravel signal, the comparison circuit 150 has indicated that the turret is approaching the commanded indexing position, the index turret signal at conductor 156, FIG. 7 will be high, so that the output of gate 212 will be low, setting the flip flop 215, 216 and giving an all stop signal at output conductor 320. This signal at conductor 320 may cause an interruption of the operation of the system until the overtravel condition has been corrected.

During operation, each time the turret 30 indexes to the 01 position, the turret zero switch 41 is actuated to reset the position register 90, FIG. 3, to zero. The station recognition pulse from switch 35 as the turret approaches the 01 position then sets the position counter 90 to a count of 01.

The terms "high" and "low" are used herein to designate relative logic level magnitudes. As a specific example, the high or logical one condition may correspond to a potential of the order of 5 volts, while the low or logical zero condition may correspond to a potential of zero volts (ground potential).

By way of example, the indicated pulse signals may have durations as follows:

INDEX TURRET p, about 80 milliseconds; and
TURRET BRAKE p, about 350 milliseconds.

I claim as my invention:

1. A turret indexing system comprising
   a turret for indexing movement selectively to each of a plurality of turret indexing positions and having means for generating an over travel signal as the turret moves somewhat past each indexing position,
   a command register for registering digital commands with respect to the indexing positions of the turret,
   a position register incrementally responsive to successive station recognition pulses to count in a predetermined sequence,
   a comparator circuit connected to said command register and to said position register and responsive to a coincidence in the numbers stored therein to generate a comparison signal,
   an all stop bistable circuit for supplying an all stop signal for causing interruption of the operation of the system, and
   a digital logic circuit connected with said means for generating said over travel signal to receive successive over travel signals therefrom during an indexing operation as the turret moves past successive indexing positions in moving from an initial indexing position to a desired new indexing position as represented by a digital command in said command register, said logic circuit being connected with said comparator to receive said comparison signal therefrom when the turret reaches the desired new indexing position, and being connected with said all stop bistable circuit, and
   said logic circuit being responsive to an over travel signal occurring after the occurrence of said comparison signal during an indexing movement to signal an error in the turret indexing operation since the turret has over traveled the desired new indexing position and being operable in response to such over travel of the desired new indexing position to actuate said all stop bistable circuit thereby causing interruption of the operation of said system.

2. In a turret indexing system including
   a command register for registering commanded indexing positions for the turret,
   a position register for registering a number in accordance with a present position of the turret, but susceptible to operation out of synchronization with the actual turret position, and
   a comparator circuit connected to said command register and to said position register and responsive to a lack of coincidence of numbers registered therein to assist in controlling an indexing operation,
   the improvement comprising
   a rotary turret for indexing movement selectively to each of a plurality of turret indexing positions and having turret initial position switch means actuated each time the turret reaches a predetermined initial turret indexing position in its path of movement, and
   a digital initializing circuit having an input for receiving a digital initializing signal in advance of positioning operations for insuring the synchronization of the actual turret position with the position thereof shown by said position register and responsive to said digital initializing signal for automatically indexing said turret to said predetermined initial turret indexing position under the control of said turret initial position switch means and operable to insure that the position of the turret shown by the position register corresponds to said predetermined initial turret indexing position regardless of whether the position shown by said position register corresponded to the actual turret position prior to receipt of said digital initializing signal, said digital initializing circuit comprising a turret indexing control circuit bypassing said comparator circuit and operable to initiate indexing movement of the turret in response to said digital initializing signal independently of the condition of said comparator circuit, said turret indexing control circuit controlling indexing movement during automatic indexing of said turret in response to said digital initializing signal and being connected with said initial position switch means and responsive to actuation of said initial position switch means during automatic indexing of said turret to interrupt automatic indexing of said turret when the turret reaches said predetermined initial turret indexing position.

3. The turret indexing system of claim 2 with said turret having means for generating an overtravel signal as the turret moves somewhat past each indexing position, and means responsive to an overtravel signal occuring after the turret reaches a commanded indexing position to signal an error in the turret indexing operation.

4. The turret indexing system of claim 2 wherein said turret indexing control circuit comprises a bistable circuit responsive to a digital initializing signal which is also utilized to signal that a tool change is to take place, said bistable circuit being responsive to said initializing signal to assume one of its stable conditions to produce turret indexing movement, and said bistable circuit having a second input controlled by said turret initial position switch means whereby the bistable circuit is shifted to its second stable condition in response to the turret reaching said predetermined initial turret indexing position to discontinue indexing movement of the turret.

* * * * *